(12) United States Patent
Rice et al.

(10) Patent No.: US 6,887,406 B2
(45) Date of Patent: May 3, 2005

(54) MOLDED ARTICLE HAVING HOLLOW RIM PORTION AND PROCESS FOR PRODUCING ARTICLES

(75) Inventors: Frank J. Rice, Wheatley Heights, NY (US); Bruce A. Laabs, Jr., Fredonia, WI (US); Dave P. Knicklebine, Richfield, WI (US)

(73) Assignee: Ames Planter, Inc., Camp Hill, PA (US)

( * ) Notice: Subject to any disclaimer, the term of this patent is extended or adjusted under 35 U.S.C. 154(b) by 7 days.

(21) Appl. No.: 10/344,781

(22) PCT Filed: Aug. 15, 2001

(86) PCT No.: PCT/US01/25474

§ 371 (c)(1),
(2), (4) Date: Dec. 5, 2003

(87) PCT Pub. No.: WO02/14047

PCT Pub. Date: Feb. 21, 2002

(65) Prior Publication Data

US 2004/0096602 A1 May 20, 2004

Related U.S. Application Data

(60) Provisional application No. 60/225,522, filed on Aug. 15, 2000.

(51) Int. Cl.[7] ............................................. B29D 24/00
(52) U.S. Cl. ...................... 264/40.1; 264/572; 428/34.1
(58) Field of Search ............................... 264/572, 40.1; 428/34.1

(56) References Cited

U.S. PATENT DOCUMENTS

| 4,101,617 | A | | 7/1978 | Friederich |
| 5,186,884 | A | * | 2/1993 | Hendry ........................ 264/572 |
| 5,387,391 | A | | 2/1995 | Satoh et al. |
| 5,401,459 | A | | 3/1995 | Nichols et al. |
| 5,558,824 | A | | 9/1996 | Shah et al. |
| 5,924,433 | A | | 7/1999 | Thies et al. |
| 6,019,918 | A | | 2/2000 | Guergov |
| 6,019,935 | A | | 2/2000 | Eckardt et al. |
| 6,024,911 | A | | 2/2000 | Brauner |
| 6,143,385 | A | | 11/2000 | Furuya et al. |

FOREIGN PATENT DOCUMENTS

| EP | 06330774 A1 | 6/1994 |
| GB | 2307664 A | 10/1995 |
| JP | 04231589 | 8/1992 |
| JP | 06286565 | 11/1994 |
| JP | 06136024 | 1/1996 |
| JP | 10346219 | 12/1998 |

* cited by examiner

Primary Examiner—Suzanne E. McDowell
(74) Attorney, Agent, or Firm—Eckert Seamans Cherin & Mellott, LLC

(57) ABSTRACT

A process for producing an injection molded article with a hollow rim portion in an injection molding machine including the steps of injecting a short shot of injection molding material into a mold via an injection nozzle, permitting a mold cavity to fill in an unbalanced manner as a result of a gas channel formed in a wall of the mold, closing the injection nozzle; and injecting a pressurized gas into the short shot of injection molding material, wherein the pressurized gas travels through the gas channel into a rim portion of the mold thereby expanding the injection molding material throughout the mold and simultaneously creating a hollow cavity within the rim portion of the mold.

29 Claims, 8 Drawing Sheets

25% fill

25% fill

50% fill

50% fill

100% fill

100% fill

MOLDED ARTICLE HAVING HOLLOW RIM PORTION AND PROCESS FOR PRODUCING ARTICLES

CROSS REFERENCE TO RELATED APPLICATION

The present application claims priority of U.S. provisional application Ser. No. 60/225,522 filed on Aug. 15, 2000, the entire contents of which are hereby incorporated by reference.

BACKGROUND

1. Technical Field

The present disclosure relates to an injection molding process and, in particular, to a gas assisted injection molding process for forming molded articles having a hollow portion formed in a closed geometric portion thereof, for example, a rim of a pot, container or the like. In addition, the present disclosure relates to a molded article and, in particular to a molded article having a hollow portion formed therein as a result of the gas assisted injection molding process.

2. Description of Related Art

Gas injection molding techniques are generally known, such as the technique described in U.S. Pat. No. 5,401,459. Gas injection molding can generally be described as a process where gas is injected into a plastic mold which holds hot molten plastic in order to totally fill the mold cavity, thereby providing a plastic part that is hollow. By way of example, if the typical gas injection molding technique is applied to the creation of a tube, the mold may consist of a cavity which would ultimately result in a solid bar being formed. The hollow cavity of the mold is then completely filled with molten plastic, after the cavity is injected with the molten plastic an inert gas, under high pressure, is injected into the filled mold creating a cavity therein. The excess molten plastic being simultaneously expelled through a gate into a spill cavity. More recently, a "short shot" technique of gas injection molding has been developed. During the "short shot" technique, the mold is first injected with a hot plastic, in an amount less than enough to fill the cavity of the mold. After injection of the "short shot" amount of plastic, the plastic is injected with an inert gas at high pressure. The initial "short shot" of plastic would have just begun to cool slightly at the outer edge such that the gas will blow the center of the plastic along the mold, causing the plastic to fill the mold and simultaneously creating a cavity within the tube being formed.

Typically, the total amount of plastic required for the "short shot" is determined by calculating the total volume of the mold cavity, then, determining the total weight of a solid molded article based on the specific gravity of the plastic to be injected into the mold; determining the volume of gas which is desired to replace the volume of plastic; converting the volume of gas into a percentage of the total volume and reducing the total weight of the plastic which would normally be injected to completely fill the mold by this percentage.

Until recently, the manufacture of articles having a thick hollow ring relative to the surrounding wall thickness have typically needed to be made out of clay, rotational molding or blow molding to name a few. However, the manufacture of these articles has been far beyond the normal limits of a conventional injection molding processes. The application of conventional gas assisted injection molding techniques to the manufacture of such articles results in visible volumetric shrinkage, require significant material consumption and molding cycle time, and produce a great deal of strain on the injection molding machine. Thus, in order to overcome all of these drawbacks, and others, the need exists for a gas assisted injection molding process which more efficiently produces such hollow rimmed articles.

OBJECTS AND SUMMARY OF THE INVENTION

It is an object of the present invention to provide a gas assisted injection molding process which minimizes visible volumetric shrinkage in a final molded product.

It is another object of the present invention to provide a gas assisted molding process which reduces a clamp tonnage in an injection molding machine during an injection molding process.

It is a further object of the present invention to provide a gas assisted injection molding process which reduces the material consumed for the formation of the molded product and which reduces the total molding cycle time.

The presently disclosed article includes a hollow rim portion formed in the article as a result of a gas assisted injection molding process. The article includes a base wall, an annular side wall integrally formed with the base wall, wherein the annular side wall terminates in a hollow rim portion. The article further includes a gas channel integrally formed with the article and extending from the base wall to the hollow rim portion.

The presently disclosed process for producing an injection molded article with a hollow rim portion in an injection molding machine includes injecting a short shot of injection molding material into a mold via an injection nozzle, permitting a mold cavity to fill in an unbalanced manner as a result of a gas channel formed in a wall of the mold, closing the injection nozzle, and injecting a pressurized gas into the short shot of injection molding material, wherein the pressurized gas travels through the gas channel into a rim portion of the mold thereby expanding the injection molding material throughout the mold and simultaneously creating a hollow cavity within the rim portion of the mold.

BRIEF DESCRIPTION OF THE DRAWINGS

Preferred embodiments of the presently disclosed molded article and preferred process for producing such article are described herein with reference to the drawings, wherein.

DETAILED DESCRIPTION OF PREFERRED EMBODIMENTS

Articles formed according to the presently disclosed process are designed with a hollow closed geometry portion formed at a predetermined desired position along the periphery or surface of the particular article. For purposes of illustrating the process, the present disclosure illustrates and describes the process in connection with the formation of a flower pot having a hollow circular rim (i.e., the hollow closed geometry) formed at a top portion thereof. However, it will be understood that the presently disclosed processes may be utilized to form numerous different articles having a closed loop geometry portion formed integrally therewith.

Figure 1:
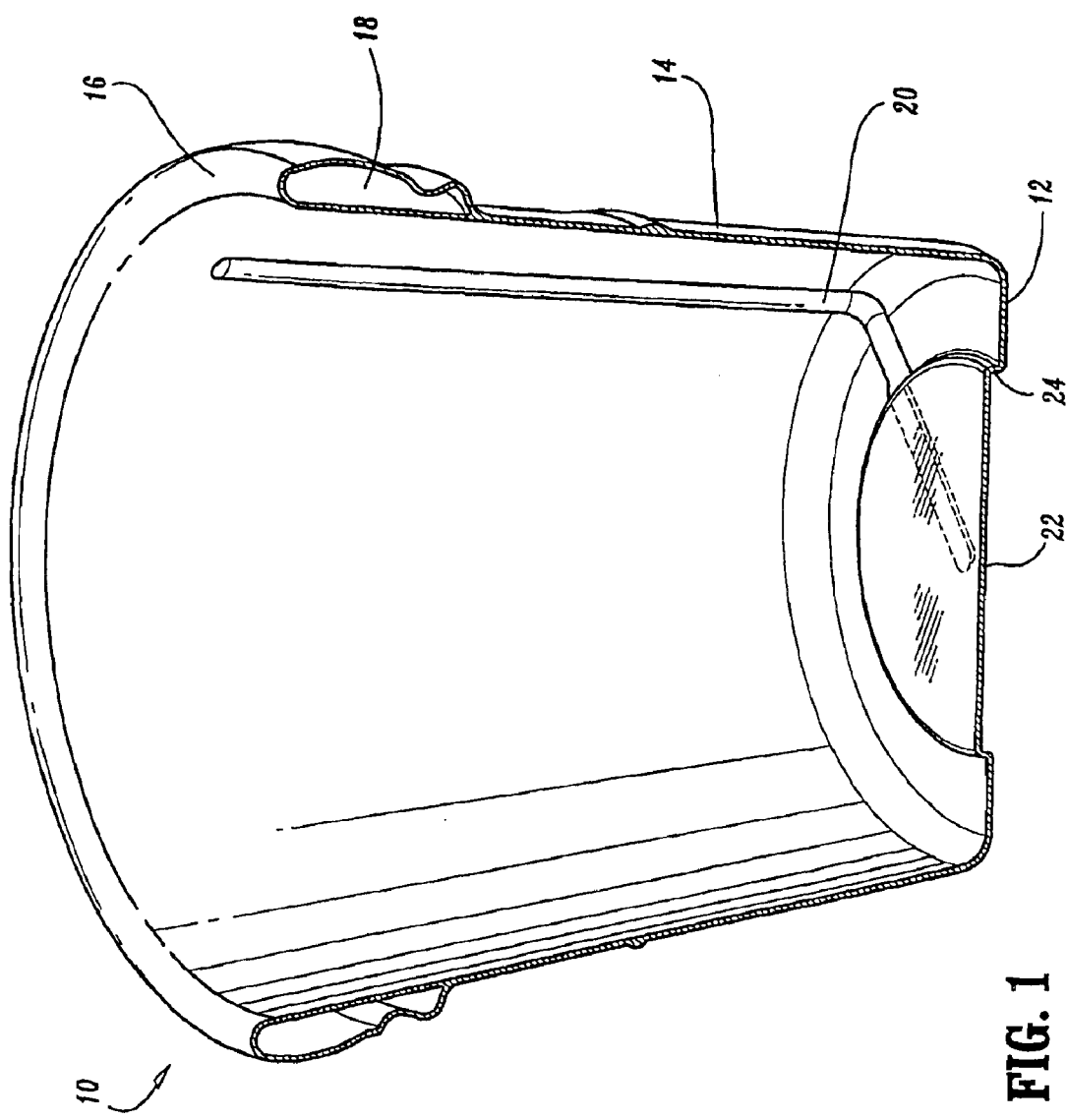
FIG. 1 is a longitudinal cross-sectional perspective view of an article formed in accordance with the presently disclosed process which shows a gas channel extending from the base of the article along the inner wall of the article to the hollow rim portion thereof.
Figure 2:
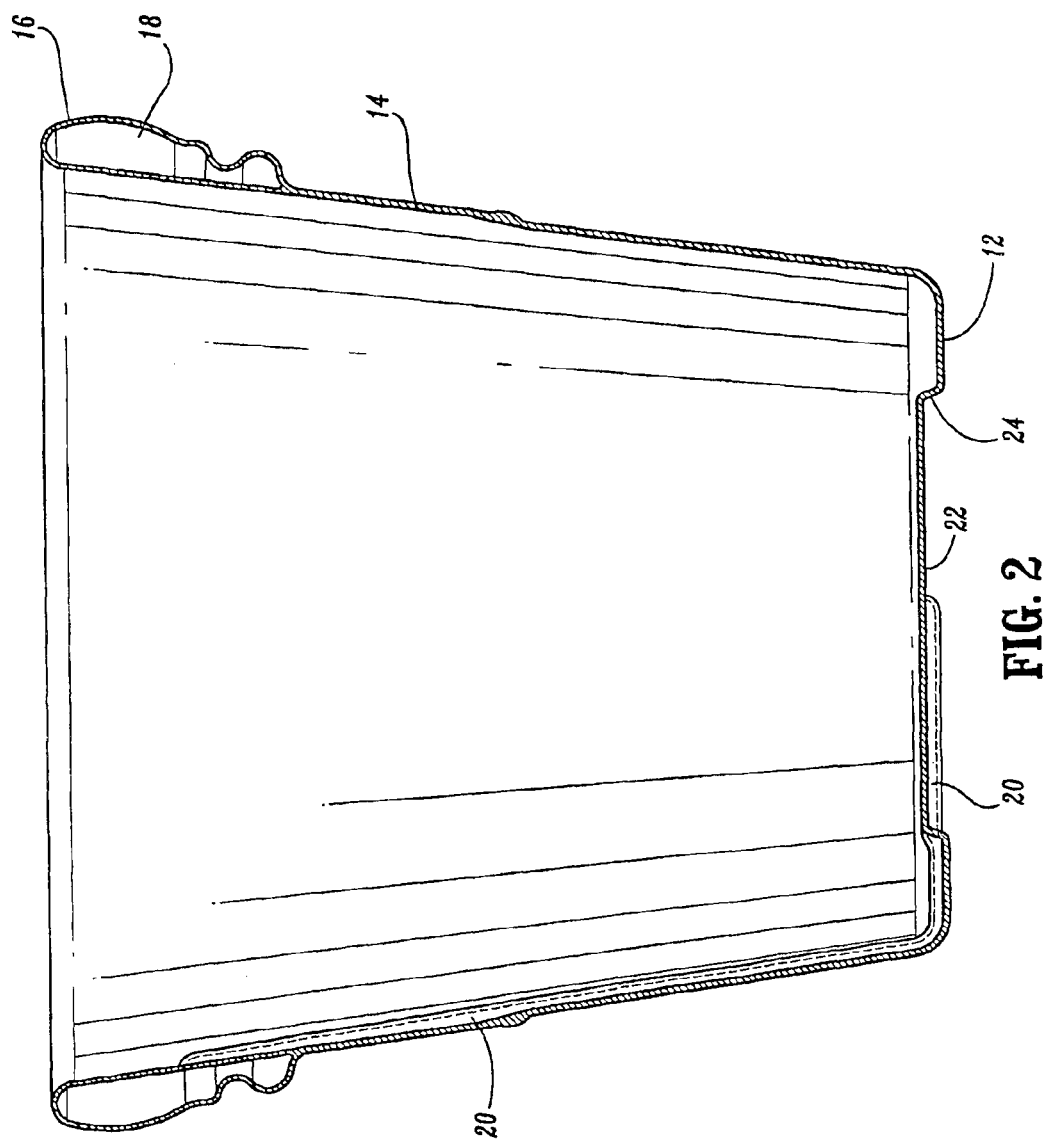
FIG. 2 is a longitudinal cross-sectional view taken through the gas channel of the article of FIG. 1.
Figure 3:
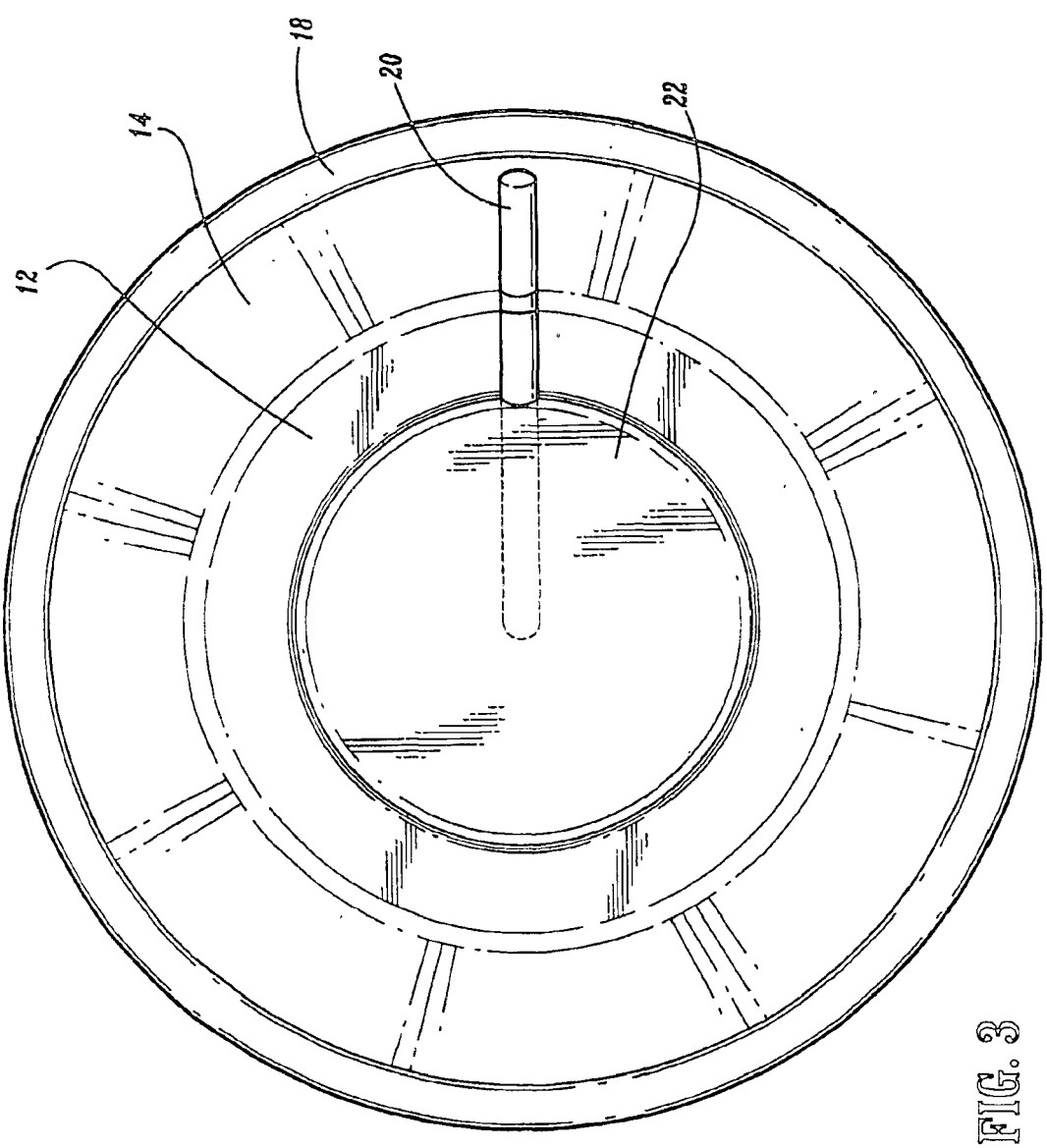
FIG. 3 is a bottom view of the article of FIG. 1.
Figure 4:
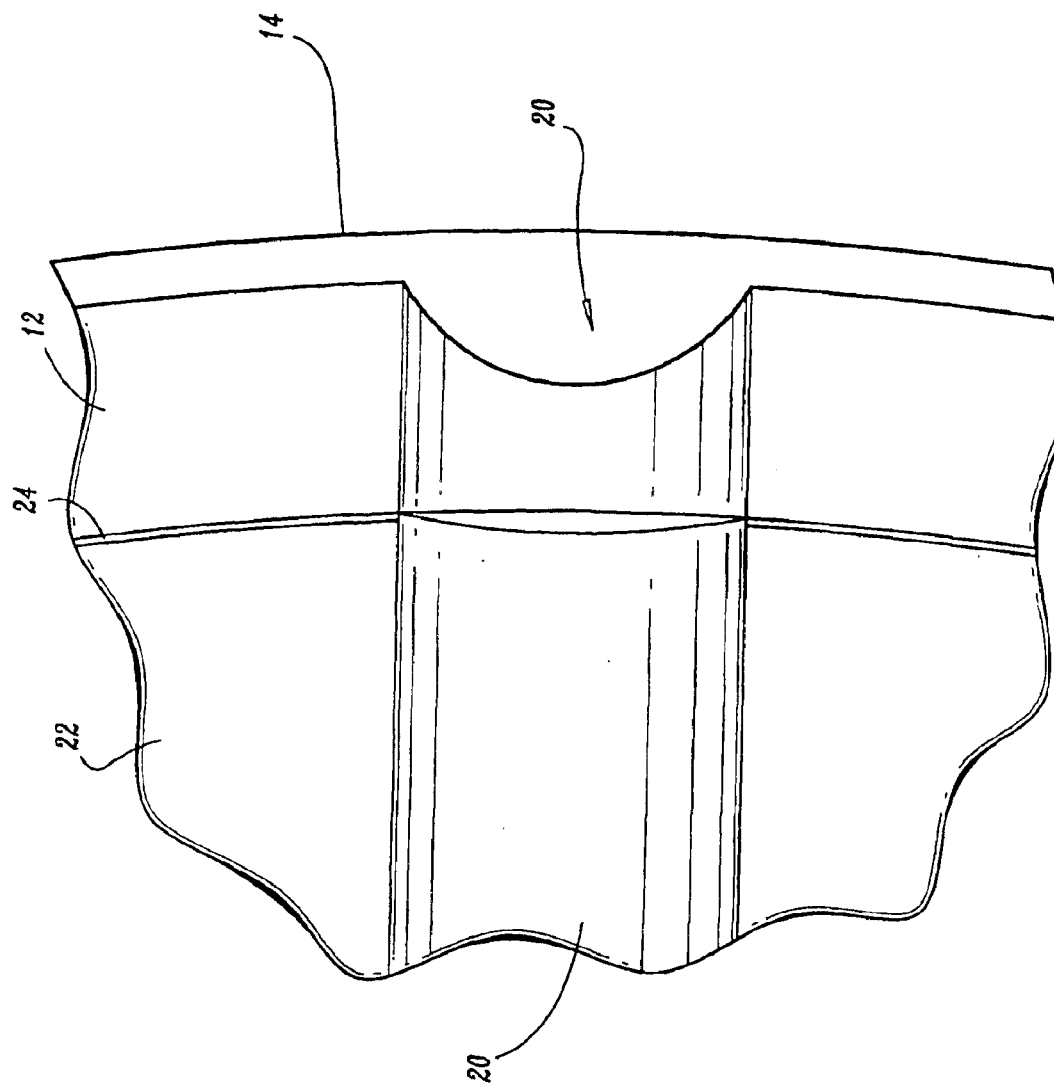
FIG. 4 is an enlarged partial cross-sectional view of the gas channel of the article as taken through the gas channel formed in the bottom wall of the article.

Referring now in specific detail to the drawings, in which like reference numerals identify similar or identical elements throughout the several views, and initially to FIGS. 1 and 2, an illustrative example of the presently disclosed article is shown as a flower pot 10. The flower pot 10 includes a base wall 12 having an annular side wall 14 integrally formed therewith and extending upward therefrom and terminating in a hollow rim 16 defining a rim cavity 18. The flower pot 10 further includes a gas channel 20 integrally formed along the base wall 12 and extending up the annular side wall 14. The gas channel 20 commences substantially at the center of the base wall 14 and extends radially toward the annular side wall 14 and then up the annular side wall 14 to the hollow rim 16. In this manner, an open passage is provided between the base wall 14 of the flower pot 10 and which opens into the rim cavity 18 of the hollow rim 16.

By way of example, the bottom wall 12 includes a circular raised portion 22 protruding into the flower pot 10, which circular raised portion 22 interconnects with the remainder of the base wall 12 via an interconnecting annular wall 24. As seen in FIGS. 1 and 2, the gas channel 20 protrudes outwardly from the circular raised portion 22 of the bottom wall 12 of the pot 10 and then protrudes inwardly from the remainder of the bottom wall 12 of the pot 10 after having passed the interconnecting annular wall 24. The gas channel 20 continues to protrude into the flower pot 10 from the interconnecting annular wall 24 until the gas channel 20 reaches the hollow rim 16.

The amount the gas channel 20 protrudes from the bottom of the circular raised portion 22 is less than the height of the interconnecting annular wall 24. In this manner, the flower pot 10 will sit properly and flushly on a flat level surface. Beyond the interconnecting annular wall 24, the gas channel 20 protrudes inwardly thereby remaining flush with the outer surface of the annular side wall 14 thus providing the flower pot 10 with a smooth contour around the entire girth thereof. While the gas channel 20 has been shown to protrude into the flower pot 10, it is envisioned that the gas channel 20 can also be formed to protrude outwardly from the flower pot 10 or in any other orientation desired.

The gas channel 20 has been shown to commence at substantially the center of the base wall 12 of the flower pot 10. However, it is envisioned that the gas channel 20 can be formed to commence at any preselected or predetermined location on the surface of the flower pot. In practice, the location of the starting point of the gas channel 20 corresponds to the location of a gate (i.e., the hole through which the injection material enters the mold from the barrel of an injection molding machine) in an injection molding machine.

The mold of an injection molding machine is essentially a negative of the article to be molded. By way of example, the mold for the flower pot 10 would typically include a cavity half, defining the outer surface of the article, and a core half, defining the inner surface of the article. As such, the gas channel 20 would begin as a depression formed substantially at the gate of the cavity half of the mold (i.e., corresponding to the outside surface of the article) and extend radially from the gate location. When the gas channel depression reached the location of the interconnecting annular wall, the depression for the gas channel in the cavity half of the mold would then transition to a depression formed in the core half of the mold (i.e., corresponding to the inside surface of the article). The depression for the gas channel in the core half of the mold then continues to the edge of the core half of the mold, up the side of the core half of the mold and terminates at a point where the hollowed rim is to begin being formed and where the gas is to be directed into the rim.

The gas channel 20 serves essentially two purposes, namely, to enable a gas bubble to propagate from the mold gate to the portion of the mold in which the hollowed cavity is to be formed; and to create an unbalanced fill situation (i.e., directing the flow of injected material to one side of the article instead of allowing the injected material to flow evenly over the part). The unbalanced fill situation results from designing a gas channel in the mold, which gas channel directs the flow of injection material from the base of the article to the rim of the article in an uneven manner. Since molten injection material (i.e., plastics, resins, etc.) are fluid materials, the resin is compelled to first flow toward the path of least resistance. In other words, since the gas channel is a larger opening than the space between the base of the core half of the mold and the base of the cavity half of the mold, the resin will have a tendency to first flow through the gas channel created than between the base of the core half and the base of the cavity half of the mold. As such, the majority of molten injection material first flows through the gas channel along the bottom and then up the side of the flower pot 10.

A process for manufacturing such injection-molded articles and, in particular, with regard to the flower pot 10 used as an example in the present disclosure, will now be described. According to the present disclosure, the flower pot 10 is manufactured by injecting a "short shot" of molten resin, through the gate of a mold and filling the mold in an unbalanced manner. When the short shot is complete the injection nozzle is shut off and a pressurized gas is injected into the gate of the mold. Screw recovery and a sprue break are then performed. The mold is then opened and the article is cooled.

As described above, the "short shot" technique of gas injection molding requires the injection of a molten resin, in an amount which is less than that required to entirely fill the cavity of the mold. The total amount of resin required for the "short shot" is determined by calculating a total volume of the mold cavity, determining a total weight of a solid molded article based on a specific gravity of the resin to be injected into the mold, determining a volume of gas which is desired to replace a volume of the solidified resin, converting the volume of gas into a percentage of the total volume and reducing the total weight of the resin which would be injected to completely fill the mold by this percentage.

The mold is caused to be filled in an unbalanced manner. As described above, the gas channel 20 is formed as a depression in both the cavity half and the core half of the mold and extends radially from the gate in the base and up the side of the flower pot 10 terminating at the entry point of the gas for the hollowed rim 16. The gas channel 20 acts as a path of least resistance for the molten resin thus causing greater amounts of the molten resin to flow towards the side of the flower pot 10 having the gas channel than to the opposed side of the flowerpot 10.

In addition to injecting the mold with a "short shot" and in addition to having the mold filled in an unbalanced fashion, it is necessary to keep the resin molten prior to the initiation of the gas injection into the flower pot 10. By keeping the resin molten, the gas is able to push the resin though the mold cavity and hesitation marks on the article are thus reduced. A hesitation mark is line created on the molded article as a result of the split second delay in switching from injection of molten resin to injection of the pressurized gas. It is preferred that a high melt polypropylene, preferably about 45 to about 50 melt Block Copolymer with about a 1.5 to about a 2 izod be used as the resin. The resin should be retained in a heated barrel of an injection molding machine and wherein the temperature of the heated barrel is maintained at about 480° F. (248.9° C.) in the rearward portion of the barrel and about 500° F. (260° C.) in the forward portion of the barrel. In addition, the article to be molded should not require any more than 75% of the total injection volume capacity of the heated barrel. Finally, the injection molding pressure and speed should be between about 90% and about 95% of the total capacity to insure that the resin is pushed through the part as fast as the injection molding machine is capable of without causing any shearing of the resin through the mold.

Figure 5B:
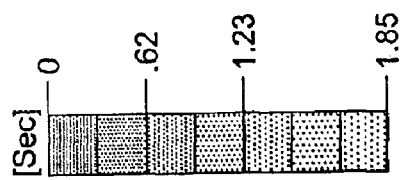
FIG. 5B is a perspective view of the plot of the time to fill 25% of the article shown in FIG. 1 as seen from the outside of the article on the same side as the gas channel.
Figure 5B:
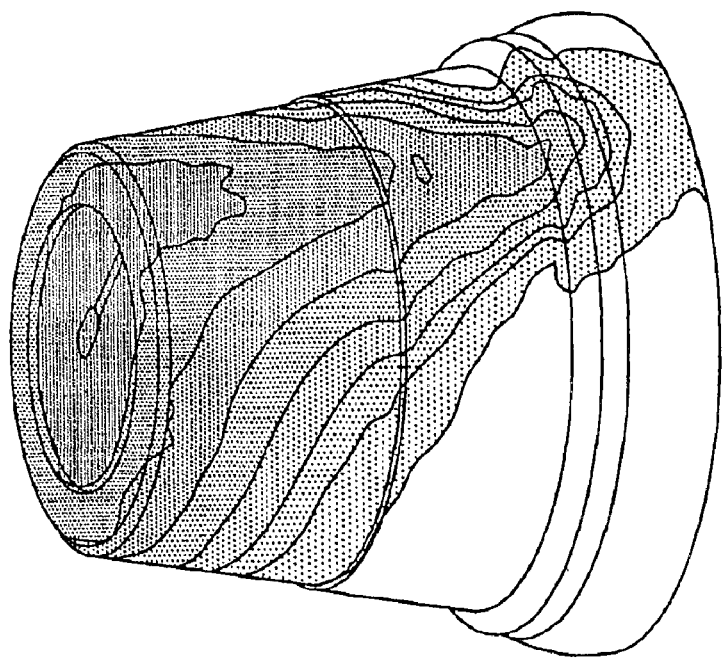
Figure 5A:
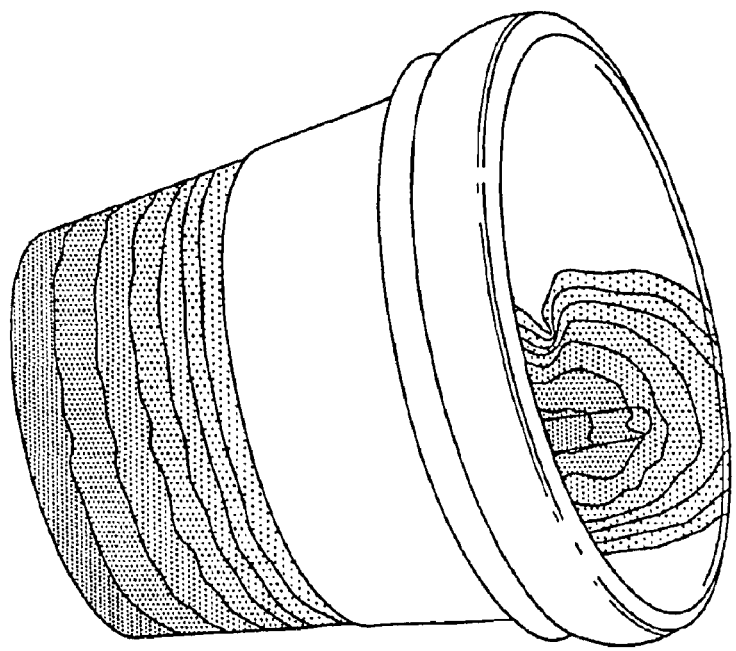
FIG. 5A is a perspective view plot of the time to fill 25% of the article shown in FIG. 1 as seen from the outside of the article on a side opposite the gas channel.

As seen in FIGS. 5A and 5B, the objective at the end of the injection of the resin is to have a mold which has an unbalanced fill of resin, and which resin extends from the base of the mold and substantially along one side of the mold (i.e., the side corresponding to the side of the gas channel 10).

Next, the injection nozzle for the molten resin is shut off and the gas injection is commenced. Immediately after the injection of the molten resin is complete, the nozzle injecting the molten resin into the mold is closed off which simultaneously prevents any gas from going up into the barrel of the injection molding machine as a result of the gas injection step.

At this point a gas injection process is initiated through the gate of the mold, which gas injection process propagates a gas bubble through the gas channel 20 in the base of the mold, up the gas channel 20 in the side of the mold and into the hollowed rim 16 thus beginning the formation of the rim cavity 18. For the present example of the flower pot 10, it is preferred that the gas pressure should be initiated and maintained at about 2000 P.S.I. (140.6 Kg/cm$^2$) to about 2300 P.S.I. (161.7 Kg/cm$^2$) until the two molten ends of the injected "short shot" resin come together. At that point, the gas pressure should be reduced to about 800 P.S.I. (56.25 Kg/cm$^2$) in order to slow the flow of resin and to permit any trapped gas to escape without burning the finish.

In order to have the gas introduced into the mold at the proper pressure and at the proper time, a gas controller unit is wired to the injection molding machine. The gas controller unit enables the gas to be injected at a specific time or at a specific position as read by the injection molding machine.

By shutting off the injection nozzle for the molten resin, the gas injection step for the present article creates a back pressure of about 200 P.S.I. to about 350 P.S.I. (14.06 Kg/cm$^2$ to 24.6 Kg/cm$^2$). The back pressure is used to aid in the breaking down of material and in the blending of a colorant with the material within an injection molding ferrule of the machine.

Preferably, the gas injection step of the injection molding process is executed according to a predetermined pressure profile, wherein the injection pressure is changed during a plurality of elapsed time segments of the total gas injection phase. The particular pressure profile for a given article is determined by several factors, including but not limited to the following, for example, the configuration and geometry of the part, the mold design, and the type of injection molding material used. The gas injection process stops when either the mold cavity is completely filled with resin or when the molten front edge of the resin solidifies, whichever occurs first.

Preferably, the gas injection point is the same as the injection point for the molten resin. However, it is envisioned that the gas injection point can be different than the point for the injection of the molten resin.

Figure 8:
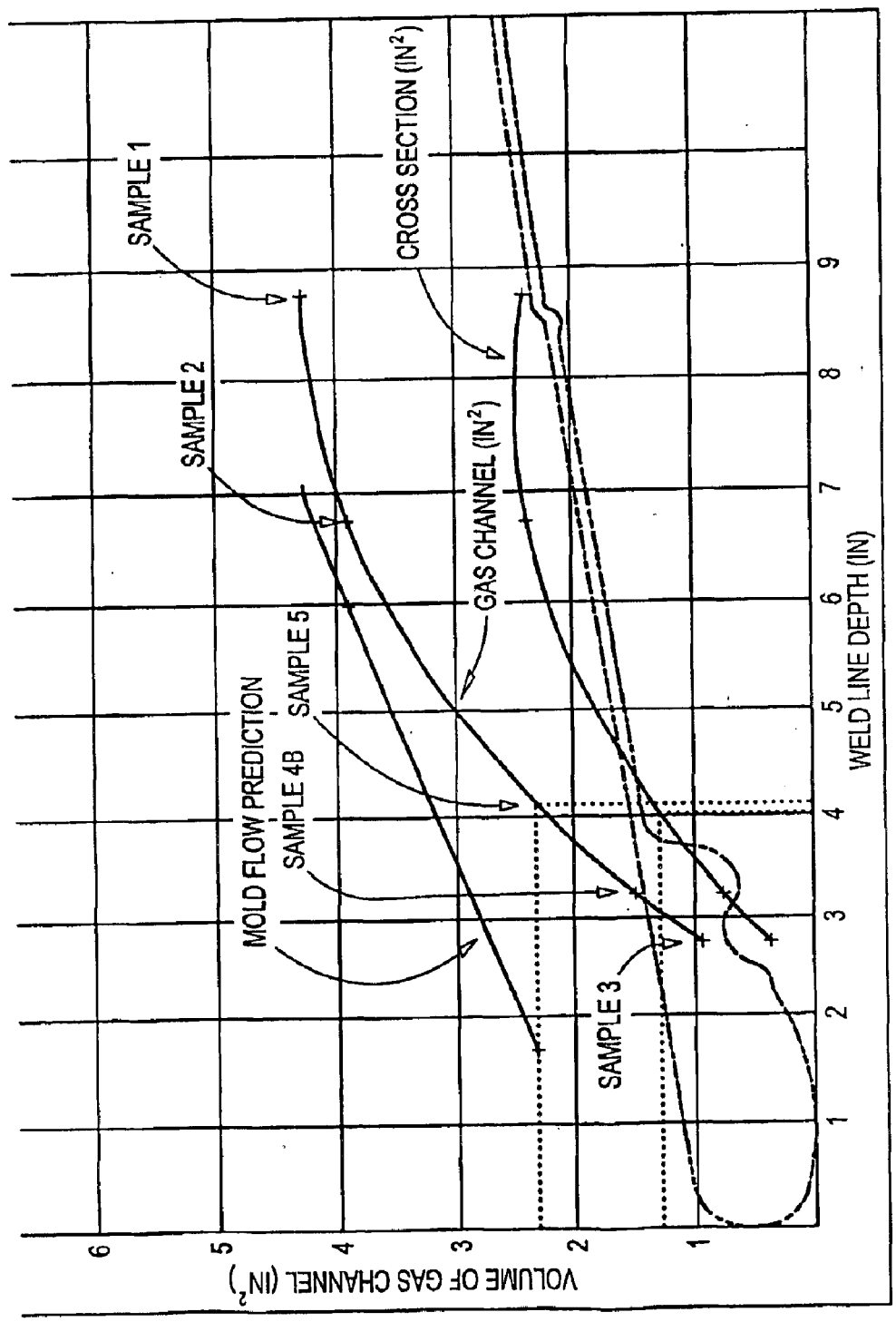
FIG. 8 is a graph illustrating the relationships for a particular article design necessary for the proper implementation of the injection molding process according to the present invention.

An effective gas channel design is obtained trough either destructive or non-destructive testing methods. The destructive method is a trial and error process using an obsolete mold and modifying it by forming conventional gas channel configurations therein, welding the mold and re-cutting the mold many times until the final configuration results in the best practice for manufacturing a gas assisted molded article. The non-destructive method utilizes a computer simulated gas analysis package, a computer-assisted mold filing analysis package, both in conjunction with establishing the non-linear relationship between the gas channel cross-section, the gas channel length, and the location of a weld line. Once these relationships are established, the desired result and specifications for the construction of the gas channel 20 can be found by interpolation. As seen in FIG. 8, the relationships for a particular design are depicted.

The weld line depth of the article (i.e., the distance from the weld line of the resin to the area where the thicker rim of the article meets the nominal wall thickness of the article) is of particular interest when designing the article for gas-assisted hollow rim molding. The weld line depth which gives the largest processing window is a distance of about zero inches (0 inches or 0 centimeters) to about one inch (1 inch or 2.54 centimeters). At this depth a molding technician is able to control the resin melt temperatures, the resin fill speed, the gas filling profile and can make adjustments to the weld line depth.

It is generally understood that in order to control the gas filling pattern the resin fill pattern must first be controlled. As such, the unbalanced fill pattern together with the weld line location serves two purposes which were not thought possible prior to the development of the current process. The first purpose is the creation of a low pressure area in the mold and the creation of a last point to fill which corresponds to the end point of the gas channel. According to the process, the low pressure area is where the injected gas wants to be drawn to and thus results in the gas actually being drawn thereto. The second purpose is that no excess resin is injected into the mold which would later be displaced. Only the right amount of resin is initially injected such that the injected gas then displaces the resin in the low pressure area and backfills down the wall of the mold thereby forming the weld line. It is this later purpose which makes the weld line depth the important relationship. If the weld line is too high, the weld line becomes visible on the rim of the article and the thick rim is not completely hollowed out. If, on the other hand, the weld line is too low then the gas bubble blows through the front of the molten resin before the resin completely fills the mold cavity, thereby resulting in an incomplete article being manufactured.

It is preferred that the weld line should always be positioned such that the weld line is at the bottom of the article and that the flow of gas and resin need to overcome gravitational forces during the process. If the position of the mold is other than this orientation, then the gravitational forces cause the resin to drip down the rim before the gas is injected and thus there will not be enough resin in the areas that are to be hollowed out with the gas thus resulting in a potential blow-out situation.

Next, the injection molding process undergoes a sprue break (i.e., the decoupling of the injection nozzle from the sprue after each injecting shot). Since the nozzle for the molten resin is closed following the injection of the molten resin, the flow of molten resin from the barrel is prevented thus eliminating the spillage of any molten resin from the nozzle, a sprue break can be utilized without any effect on the injection machine or on the article being molded.

The sprue break allows for the complete injection unit to be moved away from the mold effectively taking the contact of the nozzle tip away from the gate opening in the mold. By taking the nozzle tip away from the gate opening in the mold, any excess gas pressure trapped within the molded article is able to escape out through the gate of the mold. It is preferable that the total distance for the sprue break be about 0.1575 inches to about 0.2365 inches (4 mm to 6 mm).

Once sufficient cooling has occurred to allow the outer skin of the article to set-up and form the shape of the article, the mold can be opened. The article is then removed from the mold, for example, with the aid of a robot arm and transferred to a conveyor that leads the article to a water bath for cooling. It is preferable that the conveyor should be at a 4 degree pitch and index each shot into the bath.

The water bath is provided with copper tubing which is submerged in the water and which are connected to a chiller. The chilling effect of the copper tubing running through the water bath ensures that the temperature of the water bath does not exceed about 50° F. (10° C.). The water bath may also be provided with a plurality of bubblers and/or jets to circulate the water and which ensure that the water is kept from freezing. It is preferred, that for the flower pots of the present disclosure, that each flower pot be submerged for about 45 seconds.

After cooling, the articles are removed from the water bath and transported to a packaging area where the articles are packaged for storing and shipping.

FIGS. 5A and 5B show the injection molding process, at 25% complete, for the article according to the presently disclosed example, namely, the flower pot 10 at a time about when the injection of the resin is complete and the gas injection is about to begin. As seen from FIGS. 5A and 5B, the gas channel 20 has forced more resin to one side of the flower pot 10, thereby evidencing the unbalanced filling nature of the currently disclosed process.

Figure 6B:
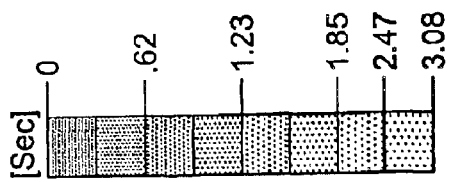
FIG. 6B is a perspective view of the plot of the time to fill 50% of the article shown in FIG. 1 as seen from the outside of the article on the same side as the gas channel.
Figure 6B:
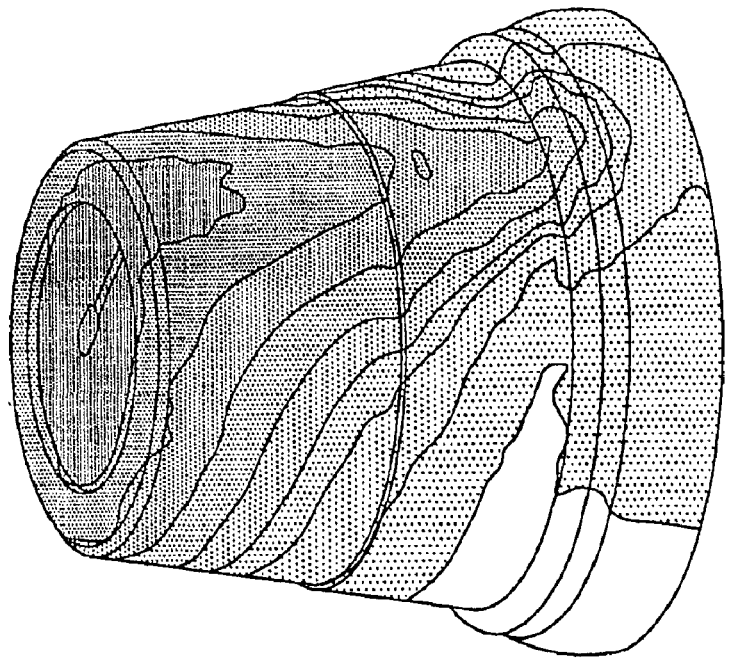
Figure 6A:
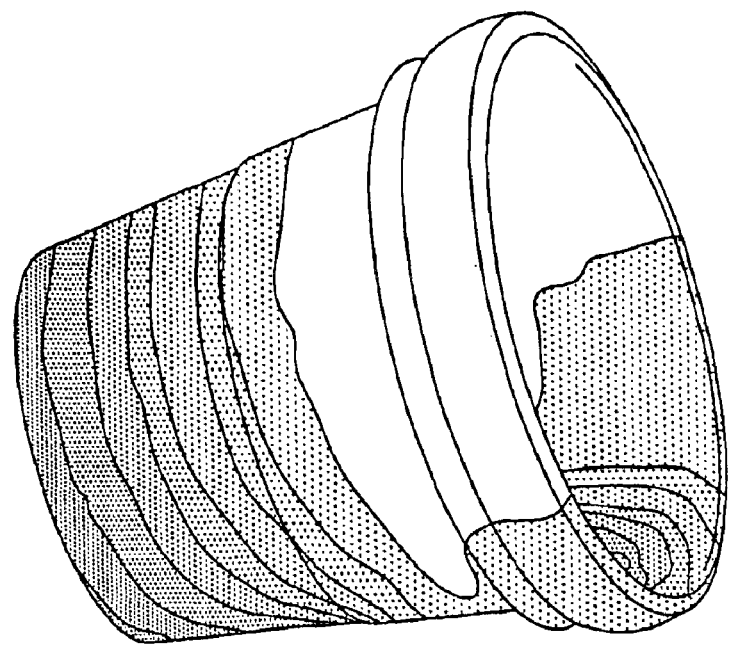
FIG. 6A is a perspective view plot of the time to fill 50% of the article shown in FIG. 1 as seen from the outside of the article on a side opposite the gas channel.

FIGS. 6A and 6B show the injection molding process at 50% complete. As seen from FIGS. 6A and 6B, as the gas injection is taking place the resin is further forced to one side of the flower pot 10. The resin is still unbalanced within the mold.

Figure 7B:
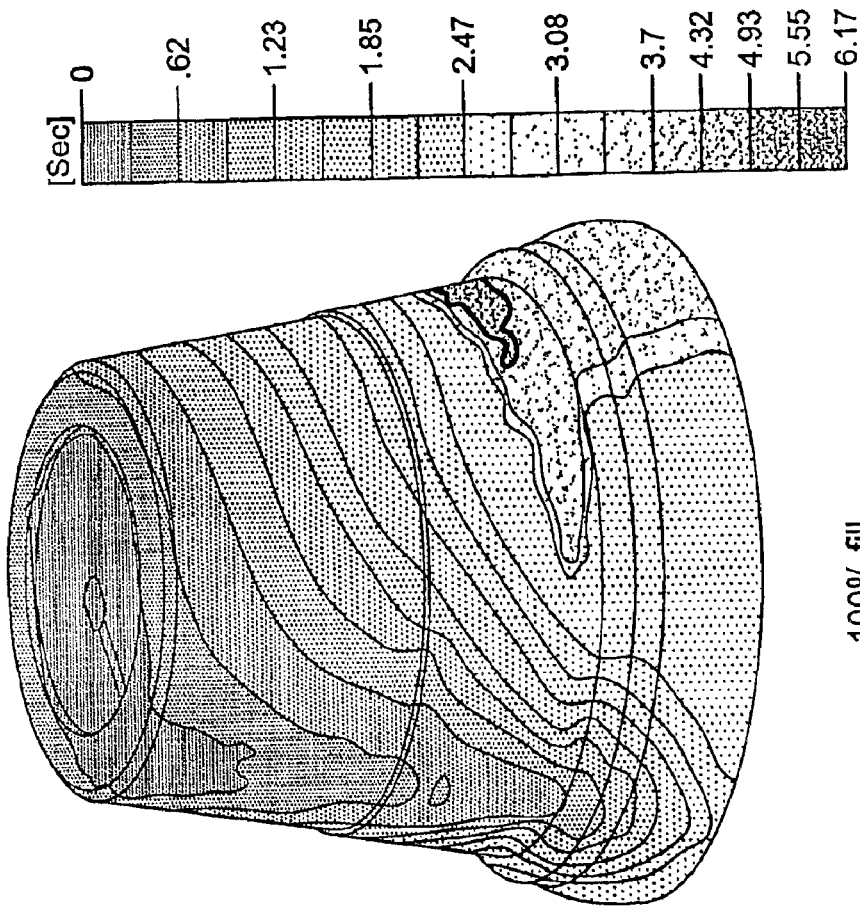
FIG. 7B is a perspective view of the plot of the time to fill 100% of the article shown in FIG. 1 as seen from the outside of the article on the same side as the gas channel.
Figure 7A:
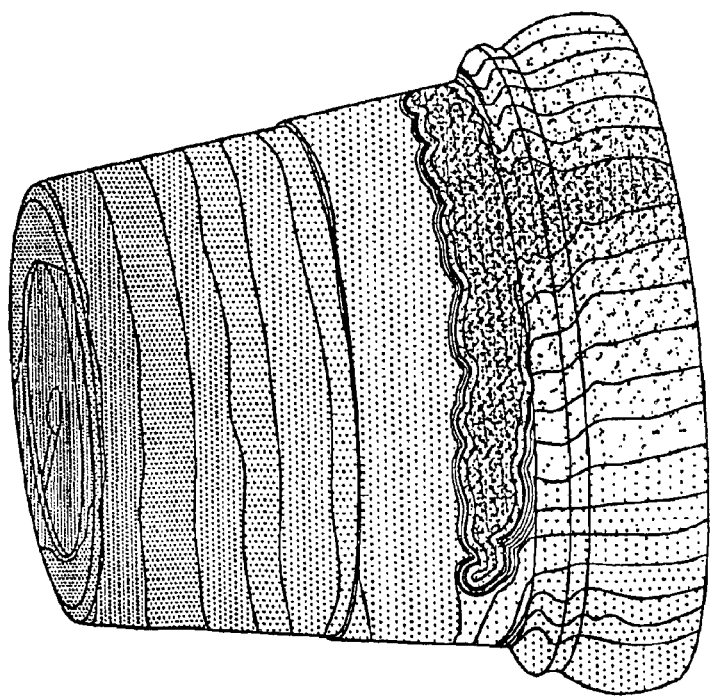
FIG. 7A is a perspective view plot of the time to fill 100% of the article shown in FIG. 1 as seen from the outside of the article on a side opposite the gas channel.

FIGS. 7A and 7B show the injection molding process at 100% completion. As seen from FIGS. 7A and 7B, the mold for the flower pot has been completely filled with the resin. Also evident is that the region was last to be filled was the region located on the side opposite the gas channel 20 of the flower pot 10.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the appended claims.

What is claimed:

1. A process for producing an injection molded article having a hollow rim portion, comprising the steps of: providing a mold having a mold cavity and a mold core, wherein a gas channel depression is formed along at least one surface of the mold core and the mold cavity and extending between a gate of said mold and a rim portion of said mold; injecting a short shot of injection molding material into said mold via an injection nozzle; permitting said mold cavity to fill in an unbalanced manner as a result of said gas channel; closing said injection nozzle; and injecting a pressurized gas into said short shot of injection molding material, wherein said pressurized gas travels through said gas channel into said rim portion of said mold thereby expanding said injection molding material throughout said mold and simultaneously creating a hollow cavity within said rim portion of said mold.

2. The process according to claim 1, further comprising the step of calculating an amount of said short shot of injection molding material to be injected into said mold; said calculating step including: determining a total volume of said mold; determining a total weight of a solid molded article based on a specific gravity of said injection molding material; determining a volume of gas which is desired to replace a volume of said molded article; converting the volume of gas into a percentage of the total volume; and reducing the total weight of the solid molded article by said percentage of said total volume.

3. The process according to claim 1, further comprising the step of maintaining said injection molding material molten prior to the injection of said pressurized gas.

4. The process according to claim 1, wherein said injection molding material is a high melt polypropylene.

5. The process according to claim 4, wherein said high melt polypropylene is about 45 to about 50 melt Block Copolymer with about 1.5 to about 2 izod.

6. The process according to claim 1, wherein said injection molding material is retained in a heated barrel prior to injection.

7. The process according to claim 6, wherein said heated barrel is maintained at a temperature of about 480.degree. F. (248.9.degree. C.) in a rearward portion thereof and at a temperature of about 500.degree. F. (260.degree. C.) in a forward portion thereof.

8. The process according to claim 1, wherein an injection molding pressure and speed is between about 90% and about 95% of the total capacity.

9. The process according to claim 1, wherein said pressurized gas is injected into said short shot of injection molding material at a pressure of about 2000 P.S.I. (140.6 Kg/cm.sup.2) to about 2300 P.S.I. (161.7 Kg/cm.sup.2).

10. The process according to claim 9, wherein said pressure of said pressurized gas is reduced to about 800 P.S.I. (56.25 Kg/cm.sup.2) when the two molten ends of said short shot of injection molding material come together.

11. The process according to claim 1, further comprising the step of controlling a pressure of said pressurized gas and controlling a time of injection of said pressurized gas via a controller unit.

12. The process according to claim 1, wherein said short shot of injection molding material and said pressurized gas are injected into said mold via the same gate.

13. An injection molded article having a hollow rim portion formed therein as a result of a gas assisted injection molding process, said article comprising: a base wall; an annular side wall integrally formed with said base wall, wherein said annular side wall terminates in a hollow rim portion; a gas channel integrally formed with said article and extending from said base wall to said hollow rim portion; and wherein said base wall includes a circular raised portion and an annular wall interconnecting said circular raised portion with said base wall.

14. The article according to claim 13, wherein sais gas channel protrudes along an inner surface of said annular side wall and along an inner surface of said base wall.

15. The article according to claim 13, wherein said gas channel protrudes along an outer surface of said circular raised portion and protrudes along an inner surface of a remainder of said base wall beyond said interconnecting annular wall and along an inner surface of said annular side wall, up to said hollow rim.

16. The article according to claim 13, wherein said gas channel commences at a gate mating portion formed by a mold for said article.

17. The article according to claim 13, wherein said article is made of a high melt polypropylene.

18. A process for producing an injection molded article with a hollow rim portion in an injection molding machine, which injection molding machine includes a mold having a mold cavity and a mold core, wherein a gas channel depression is formed along at least one surface of the mold core and the mold cavity and extending between a gate of said mold and a rim portion of said mold, the process comprising the steps of: injecting a short shot of injection molding material into said mold via an injection nozzle; permitting said mold cavity to fill in an unbalanced manner as a result of said gas channel; closing said injection nozzle; and injecting a pressurized gas into said short shot of injection molding material, wherein said pressurized gas travels through said gas channel into said rim portion of said mold thereby expanding said injection molding material throughout said mold and simultaneously creating a hollow cavity within said rim portion of said mold.

19. The process according to claim 18, further comprising the step of calculating an amount of said short shot of injection molding material to be injected into said mold; said calculating of said short shot including: determining a total volume of said mold; determining a total weight of a solid molded article based on a specific gravity of said injection molding material; determining a volume of gas which is desired to replace a volume of said molded article; converting the volume of gas into a percentage of the total volume; and reducing the total weight of the solid molded article by said percentage of said total volume.

20. The process according to claim 18, further comprising the step of maintaining said injection molding material molten prior to the injection of said pressurized gas.

21. The process according to claim 18, wherein said injection molding material is a high melt polypropylene.

22. The process according to claim 21, wherein said high melt polypropylene is about 45 to about 50 melt Block Copolymer with about 1.5 to about 2 izod.

23. The process according to claim 18, wherein said injection molding material is retained in a heated barrel prior to injection.

24. The process according to claim 23, wherein said heated barrel is maintained at a temperature of about 480.degree. F. (248.9.degree. C.) in a rearward portion thereof and at a temperature of about 500.degree. F. (260.degree. C.) in a forward portion thereof.

25. The process according to claim 18, wherein an injection molding pressure and speed is between about 90% and about 95% of the total capacity.

26. The process according to claim 18, wherein said pressurized gas is injected into said short shot of injection molding material at a pressure of about 2000 P.S.I. (140.6 Kg/cm.sup.2) to about 2300 P.S.I. (161.7 Kg/cm.sup.2).

27. The process according to claim 26, wherein said pressure of said pressurized gas is reduced to about 800 P.S.I. (56.25 Kg/cm.sup.2) when the two molten ends of said short shot of injection molding material come together.

28. The process according to claim 18, further comprising the step of controlling a pressure of said pressurized gas and controlling a time of injection of said pressurized gas via a controller unit.

29. The process according to claim 18, wherein said short shot of injection molding material and said pressurized gas are injected into said mold via the same gate.

* * * * *